A. TRIBLE.
TROLLEY.
APPLICATION FILED FEB. 23, 1912.
1,044,298.
Patented Nov. 12, 1912.
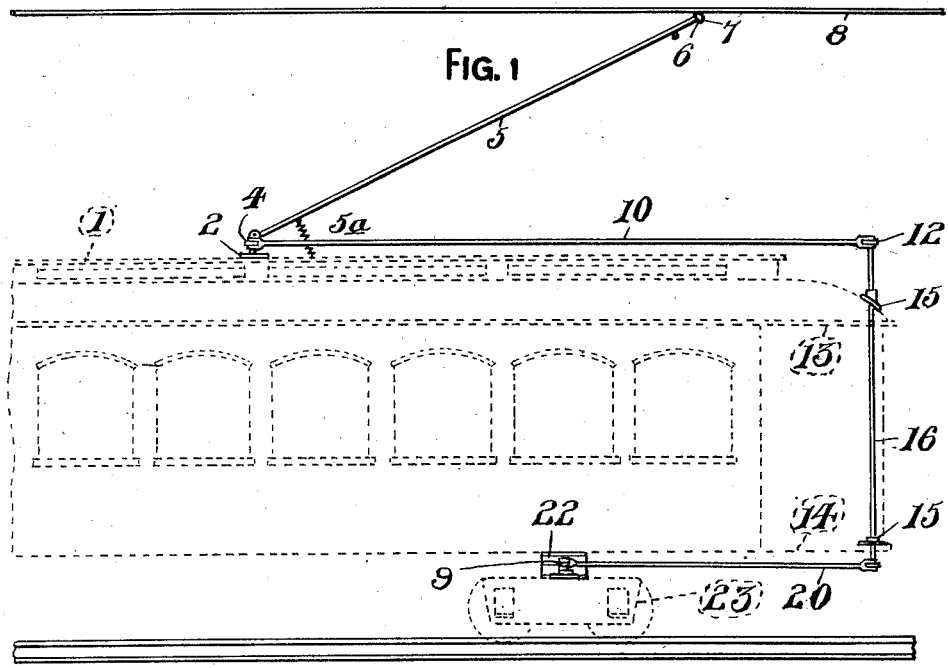
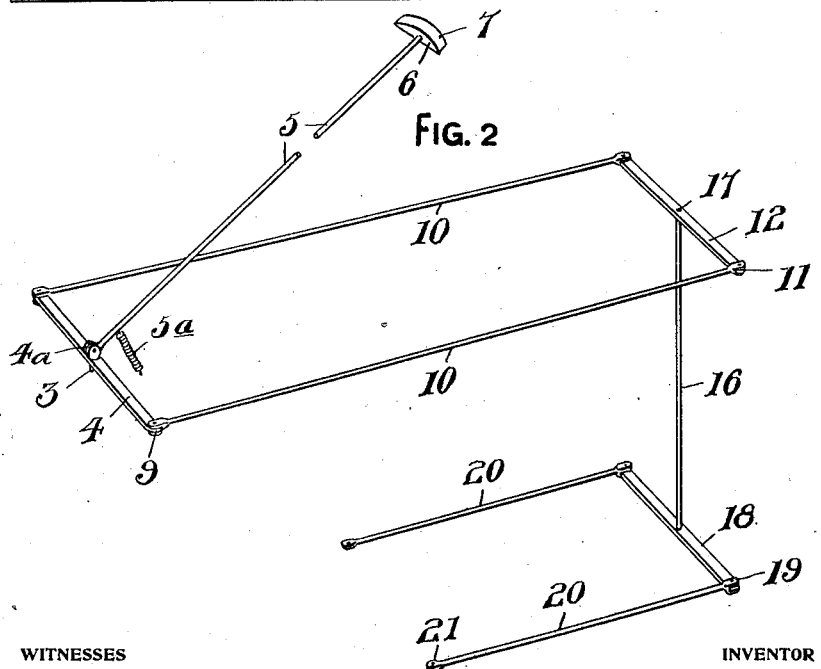
WITNESSES
INVENTOR
*Arthur Trible*
BY
ATTORNEYS

UNITED STATES PATENT OFFICE.

ARTHUR TRIBLE, OF WILMERDING, PENNSYLVANIA, ASSIGNOR OF ONE-HALF TO LEWIS W. VANNEAR, OF WILKINSBURG, PENNSYLVANIA.

TROLLEY.

1,044,298.  Specification of Letters Patent.  Patented Nov. 12, 1912.

Application filed February 23, 1912. Serial No. 679,444.

*To all whom it may concern:*

Be it known that I, ARTHUR TRIBLE, a citizen of the United States of America, residing at Wilmerding, in the county of Allegheny and State of Pennsylvania, have invented certain new and useful Improvements in Trolleys, of which the following is a specification, reference being had therein to the accompanying drawing.

This invention relates to trolleys, and more particularly to a trolley pole shifting mechanism that can be easily and quickly installed upon a car and actuated by one of the trucks thereof for shifting the trolley pole as the car passes around the curve, thereby preventing the pole from becoming accidentally displaced relatively to the trolley wire, such displacement being dangerous particularly in connection with cars equipped with electrically operated freight that depend upon the trolley wire for a source of electrical energy.

Another object of this invention is to provide a trolley pole shifting mechanism that is positive in its operation, durable, inexpensive to manufacture, and highly efficient for the purposes for which it is intended.

With the above and other objects in view the invention resides in the novel construction, combination and arrangement of parts to be hereinafter specifically described and then claimed.

Reference will now be had to the drawing, wherein—

Figure 1 is a side elevation of the trolley pole shifting mechanism as applied to a car that is shown in dotted lines, and Fig. 2 is a perspective view of the trolley pole shifting mechanism.

The reference numeral 1 denotes the roof of a car provided with a base plate 2 and pivotally mounted in said base plate is a vertical pin 3. Mounted upon the pin 3 above the base plate 2 is a cross head 4 having a bearing $4^a$ in which is pivotally mounted the lower end of the trolley pole 5, said pole being positioned at an angle to the cross head 4. The pole 5 is supported normally at an angle to the roof 1 of the car by a coiled compression spring $5^a$ attached by a coiled compression spring 5a attached to the roof of the car and attached to the pole 5. The upper end of the pole 5 is provided with a contact block 6 having a beveled face 7 that engages the trolley wire 8 or other electric conductor.

Pivotally connected to the ends of the cross head 4 by pivot pins 9 are the bifurcated forward ends of rearwardly extending connecting rods 10, said rods having the rear ends thereof bifurcated and pivotally connected by pins 11 to a cross head 12. The rear end 13 of the roof 1 and the rear platform 14 of the car are provided with bearings 15 for a vertical revoluble shaft 16. The upper end of the shaft 16 is connected to the cross head 12, intermediate the ends thereof, as at 17, and mounted upon the lower end of the shaft 16 is a cross head 18. This cross head is located below the rear platform 14. Pivotally connected to the ends of the cross head 18 by pins 19 are the rear bifurcated ends of truck rods 20, said rods having the forward ends thereof pivotally connected, as at 21, to the bolster or beam 22 of the rear car truck 23.

As the car passes around a curve and the rear truck 23 is shifted by following the curved track, the truck rods 20 are moved to shift the cross heads 18 and 12 and the connecting rods 10, and in consequence of this movement of the rods 10, the cross head 4 and the trolley pole 5 are shifted whereby the block 6 will remain normally in engagement with the wire 8.

From the foregoing it will be observed that I have devised a shiftable truck frame and a shiftable roof frame adapted to move in unison within said truck frame to shift a trolley pole, the pole being retained normally in position to transmit an electric current from a trolley wire or rail to the operating mechanism of the car.

The entire shifting mechanism is made of light and durable metal, and I reserve the right to use the ordinary trolley wheel in lieu of the contact block 6.

What I claim is:—

1. In a trolley pole shifting mechanism, the combination with a car having a roof and a rear truck, of a truck frame shiftable by said truck, a roof frame actuated by said truck frame, a trolley pole carried by said roof frame, and a contact block carried by the upper end of said pole.

2. In a trolley pole shifting mechanism, the combination with a car having a roof and a truck, of a truck frame, a shiftable roof frame actuated by said truck frame, a trolley pole carried by said roof frame, and means in connection with the roof of said car for maintaining the trolley pole normally at an angle thereto.

3. In a trolley pole shifting mechanism, the combination with a car having the roof thereof provided with a base plate, and said roof and the rear platform thereof with bearings, of a vertical shaft revolubly mounted in said bearings, cross heads carried by the ends thereof, truck rods having the rear ends thereof pivotally connected to one of said cross heads and the forward ends thereof pivotally connected to the rear truck of said car, connecting rods having the rear ends thereof connected to the other cross head, a pin loosely mounted in said base plate, a cross head mounted upon said pin and connected to the forward ends of said connecting rods, a trolley pole having the lower end thereof pivotally connected to said cross head, and a contact block carried by the upper end of the pole and adapted to receive the trolley wire.

In testimony whereof I affix my signature in the presence of two witnesses.

ARTHUR TRIBLE.

Witnesses:
CHRISTINA T. HOOD,
MAX H. SROLOVITZ.

Copies of this patent may be obtained for five cents each, by addressing the "Commissioner of Patents, Washington, D. C."